United States Patent [19]

Choca et al.

[11] 4,132,669

[45] Jan. 2, 1979

[54] PROCESS FOR PREPARING PHOSPHOROUS-ALUMINA CATALYSTS USING POLYCARBOXYLIC ACIDS AS EXTRUSION AIDS

[75] Inventors: Monica E. Choca, Chicago; Gerald R. Feistel, Hinsdale, both of Ill.

[73] Assignee: Nalco Chemical Company, Oak Brook, Ill.

[21] Appl. No.: 840,076

[22] Filed: Oct. 6, 1977

[51] Int. Cl.$^2$ .................. B01J 21/04; B01J 27/18
[52] U.S. Cl. ................................ 252/435; 252/437
[58] Field of Search ................. 252/435, 437; 423/628

[56] References Cited

U.S. PATENT DOCUMENTS

| | | | |
|---|---|---|---|
| 2,282,602 | 5/1942 | Drennan | 252/435 X |
| 3,232,887 | 2/1966 | Pessimisis | 252/435 |
| 3,879,310 | 4/1975 | Rigge et al. | 252/435 |
| 3,969,273 | 7/1976 | Brown et al. | 252/435 |
| 4,036,784 | 7/1977 | Gembicki et al. | 252/465 |

*Primary Examiner*—W. J. Shine
*Attorney, Agent, or Firm*—John G. Premo; Robert A. Miller

[57] ABSTRACT

Alumina-phosphorous powders can be extruded into catalysts supports having improved properties by the addition of up to 15% by weight of a polycarboxylic acid, containing 2–10 carbon atoms, based on the dry weight of the alumina-phosphorous powder prior to extrusion. The addition of the polycarboxylic acid also increases the extrusion rate.

6 Claims, No Drawings

PROCESS FOR PREPARING PHOSPHOROUS-ALUMINA CATALYSTS USING POLYCARBOXYLIC ACIDS AS EXTRUSION AIDS

INTRODUCTION

Alumina-phosphorous materials are useful as catalytic supports for hydrotreating catalysts, hydrocracking catalysts, demetallation catalysts and the like, in petroleum refining processes. In these particular processes, the support must normally be used as a formed particulate rather than as a powder such as is generally used in fluid cracking processes.

It is recognized in the art that some specialty alumina supports are difficult to form, in comparison to hydrated alumina materials, by such inexpensive methods as extrusion. Such specialty aluminas may be silica-alumina, alumina-phosphorous, or calcined aluminas. Prior art methods, such as those disclosed in U.S. Pat. No. 3,403,109 [or commonly assigned pending application, Ser. No. 623,825] which are hereinafter incorporated by reference into this application, involve in some way precipitating an alumina so as to make it more extrudable. As long as these precipitation methods lead to desirable catalytic properties in addition to satisfactory physical properties, these methods are suitable.

However, if one wants to extrude an extant phospha-alumina that has otherwise desirable catalytic properties, a more general method of extrusion is desired.

It is known in the art that alumina hydrates of a certain nature, i.e. alpha alumina monohydrates, so called pseudo-boehmites, are readily extrudable and give good strength by use of water as the sole extrusion aid.

The use of extrusion aids other than water for boehmite aluminas is known in certain special circumstances. For instance, U.S. Pat. No. 3,679,605 teaches the use of starch and methyl cellulose along with polyethylene in the extrusion of a hydrated alumina containing large amounts of boehmite to make large size pores and to aid extrusion. U.S. Pat. No. 3,804,781 teaches the use of surfactants including long chain acids in the extrusion of hydrated alumina to increase porosity. U.S. Pat. No. 3,917,808 teaches the use of mixtures of polyprotic acids such as citric acid or sulfuric acid in combination with certain monoprotic acids such as hydrochloric acid or nitric acid in order to extrude a particular alpha alumina monohydrate made by a special process.

None of the aforementioned prior art patents address themselves to the extrusion of these materials which are known to be difficult to extrude and from which it is difficult to obtain good physical properties on extrusion. This invention concerns itself with materials known to be difficult to extrude. Such materials of interest are those containing alumina in calcined forms such as gamma alumina, hydrated silica aluminas, or hydrated phospha-aluminas.

We have found that polycarboxylic acids used alone, such as citric acid, provide an extrusion aid effect to allow the rapid extrusion with the obtaining of good physical properties of such difficult to extrude alumina containing bodies. Our commonly assigned application, Ser. No. 672,379 filed Mar. 31, 1976, now abandoned, and Ser. No. 829,541 filed Aug. 31, 1977 concern the extrusion of materials containing calcined alumina, and silica aluminas respectively. The object of this disclosure is to illustrate the extrusion of phospha-aluminas useful in the catalyst area.

For some catalysts applications, it is desirable to increase porosity to ease the diffusion of larger molecules and thus, increase reactivity. However, very little new surface area is obtained by increasing pore volume in the large size pores and since increasing large size pores without concomitantly decreasing small size pores increases the overall pore volume, the apparent bulk density falls, and the mass of catalysts that can be loaded into a reactor falls.

On the other hand, in other catalyst applications, it is not desirable to pay the penalty of lower apparent bulk density or one does not wish to admit large molecules because they are catalyst poisons.

The process of this application is aimed at making strong extrudates of phospha-alumina containing materials; the extrudates having reduced pore volume in larger pores (above 600 Å diameter). The reduction of the pore volume seems to be concomitant with increased shrinkage of the extrudate on calcination when the extrusion aids of this patent are used.

OBJECTS

It is, therefore, an object of this invention to provide a method of extruding phospha-aluminas in order to obtain improved rate and good compaction of the feed powder.

It is a further object of this invention to improve the physical properties of the calcined extrudates to obtain higher crush and attrition characteristics.

Other objects will appear hereinafter.

THE INVENTION

The general method employed in this invention for the preparation of phospha-alumina extrudates includes the steps of:

A. Preparing a purified phospha-alumina powder comprising on a dry basis 3–30% $P_2O_5$ and 70–97% $Al_2O_3$.

B. Mixing said purified phospha-alumina powder with water and from 0.1–15% by weight of a water soluble polycarboxylic acid containing from 2–10 carbon atoms based on the dry weight of the powder.

C. Adjusting the moisture content of said phospha-alumina powder to an extrudable level so as to allow extrusion; and then, D. Extruding said phospha-alumina powder to prepare a phospha-alumina extrudate whereby the extrusion rate is improved over phospha-alumina powders not so treated, and an extrudate having improved properties is obtained.

Additionally, catalyst supports can be prepared from these extrudates by the additional steps of:

A. Drying the phospha-alumina extrudate; and then,

B. Calcining the dried phospha-alumina extrudate whereby a catalyst support is formed.

Catalysts useful in a variety of refining opertions utilizing the phospha-alumina catalyst supports can also be prepared by impregnating the calcined alumina extrudates formed above with water-soluble salts of one or more catalytically active metals, drying or otherwise reducing the moisture content from the impregnation step, and then recovering a phospha-alumina catalyst.

The phospha-alumina powders useful for the practice of this invention generally comprise, on a dry basis, 3–30% $P_2O_5$ and 70–97% $Al_2O_3$. It is seen that these figures can vary widely based on the type of supports desired and its end utility.

In any case, the purified phospha-alumina powder, as is, causes some extrusion difficulties as a result of its being somewhat abrasive and difficult to compact. In accordance with our invention, the phospha-alumina is mulled with an aqueous solution containing up to 0.1–15% of a polycarboxylic acid and preferably 3–7% polycarboxylic acid by weight (based on the dry weight of the phospha-alumina). The moisture is then adjusted to an extrudable level, usually 45–75% by weight, and preferably between 50–70% by weight.

The polycarboxylic acids useful in the practice of this invention contain from 2–10 carbon atoms. Examples of polycarboxylic acids which are useful include; oxalic, citric, malonic, adipic, tartaric, sebacic acids, and all other carboxylic acids falling within the above terms of this invention provided they are water soluble, aliphatic, and contain from 2–10 carbon atoms. A particularly useful polycarboxylic acid for the practice of this invention is citric acid.

The powdered material including the polycarboxylic acid of our invention can then be extruded at an improved rate yielding an extrudate having improved properties. The material after extrusion is generally predried at temperatures of from 100° to 300° F., for several hours and is then calcined at elevated temperatures generally 1,000° to 1,500° F., for several hours to form catalyst supports which are the subject of this invention. Additionally, these catalyst supports may then be impregnated with catalytically active metals and dried to form catalysts useful in a variety of refining operations.

It is interesting to note that where the prior art has recognized that shrinkage on calcination is decreased when polycarboxylic acids are used, in the practice of this invention we have actually seen an increase in the calcination shrinkage rate when catalyst supports or catalysts are prepared by the above methods. In addition, we have seen that the pore volume above 600 Å of the supports or catalysts prepared by the method of this invention is decreased relative to that where no polycarboxylic acid was used.

As an additional benefit through the practice of our invention, crush strength of the resultant catalyst supports produced in the practice of our invention generally have a minimum of a 25% increase in crush strength over materials extruded without the additives of our invention. This is important in many petroleum refining operations since the catalyst is not crushed in the bottom of a reactor by its own weight.

Phospha-alumina extrudates are utilized in a variety of applications. Among their most important, however, and the one to which this invention is directly related, is the use of this type of material as a catalyst support for materials used in petroleum refining operations. The materials prepared by the method of this invention showed utility when impregnated with catalytically active metals such as cobalt, nickel, molybdenum, and tungsten as hydrotreating catalyst for the removal of sulfur and/or nitrogen compounds from both crude and distillate fractions. The catalyst supports prepared by this invention also may find utility as cracking catalyst and catalytic supports for other hydrocarbon processing operations.

To more fully understand the nature of this invention, the following examples are given:

In the following examples, crush strength of the extrudates were determined on the side of pills of length to diameter ratio of 5:2. The attrition was determined by sieving the pills over a 20-mesh screen. 100g of the sieved pills were tumbled for 30 minutes in a standard attrition apparatus. After tumbling, the pills were resifted over a 20-mesh screen. The amount retained on the screen expressed as a percentage of the original 100g is the attrition resistance.

EXAMPLE I

Thirty gallons of water (120° F) were charged to a mixing tank with 17.6 pounds of $Al_2(SO_4)_3 \cdot 18H_2O$, 425 milliliters of concentrated $H_2SO_4$ and 2 pounds of $(NH_4)H_2PO_4$ (ammonium dihydrogen phosphate-monobasic) to give a clear solution.

In a separate container, a solution was made of 9 gallons of water (110° F), 21.2 pounds of a sodium aluminate (1.12 $Na_2O \cdot Al_2O_3 \cdot 3H_2O$) containing 46.0% by weight as $Al_2O_3$, 1.2 pounds of sodium hydroxide and 75 milliliters of 50% gluconic acid. After stirring, a clear, brown solution resulted.

The sodium aluminate solution was titrated into the aluminum sulfate solution at a rate of about 760 milliliters per minute to an endpoint of pH 9.2. The precipitated phospha-alumina gel was filtered. The filter cake was slurried with water and spray dried. The spray dried powder was purified by the following method. The powder was slurried in water (110° F) to 6% solids (based on the weight of dry $Al_2O_3$-$P_2O_5$). The pH was adjusted to 9.6 using concentrated ammonium hydroxide. The slurry was filtered. The purification procedure was repeated twice more for a total of three purifications. The filter cake was dried at 150° F. for three hours. The purified, dried phospha-alumina powder has a 33% loss on ignition. Four and one half pounds of the dried powder (3 pounds of phospha-alumina solids) were charged to a Simpson muller. A solution of 2 liters of water containing 82g of citric acid (6% by weight) were added to the muller all at once. The material was mulled for 10 minutes. The free moisture was adjusted to 58% where free moisture was determined on an O'-Haus moisture meter using 10g of sample heated for 20 minutes at a 75 setting. The mulled material was extruded through a 5/64 inch die. The pills were broken up and predried at 200° F for 3 hours, and then calcined at 1050° F for three hours. The physical properties and pore volume of the calcined extrudate are given in Table I.

EXAMPLE II

This example serves as a comparison for Example I where another sample of the phospha-alumina powder used in Example I was extruded with no citric acid. Five pounds of the purified phospha-aluminia powder from Example I were charged to a Simpson muller, mulled for 15 minutes with 2 liters of water and then an additional 7 minutes with 0.5 liters of water to give a material having a free moisture of 64%. The material was extruded through a 5/64 inch die. The pills were broken, dried and calcined as in Example I.

The physical properties and pore volume of the calcined extrudate are given in Table I.

EXAMPLE III

Thirty gallons of water (120° F) were charged to a mixing tank with 17.6 pounds of $Al_2(SO_4)_3 \cdot 18H_2O$, 425 milliliters of concentrated $H_2SO_4$ and 2.8 pounds of $(NH_4)_2HPO_4$ (dibasic) to give a clear solution.

In a separate container, a solution was made of 9 gallons of water (110° F), 21.2 pounds of a sodium aluminate (1.12 Na$_2$O.Al$_2$O$_3$.3H$_2$O) containing 46.0% by weight of Al$_2$O$_3$, 1.2 pounds of sodium hydroxide and 75 milliliters of 50% gluconic acid. After stirring, a clear, brown solution resulted.

The sodium aluminate solution was titrated into the aluminum sulfate solution at a rate of about 750 milliliters per minute to an endpoint of pH 9.4. Ammonia evolution became apparent at pH above about 8. The precipitated phospha-alumina gel was filtered. The filter cake was slurried with water and spray dried. The spray dried powder was purified by the following method. The powder was slurried in water (110° F) to 6% solids (based on the weight of dry Al$_2$O$_3$.P$_2$O$_5$). The pH was adjusted to 9.6 using concentrated ammonium hydroxide. The slurry was filtered and the cake washed through with water. This purification procedure was repeated four more times for a total of five purifications. The filter cake was dried at 150° F for 3 hours.

The purified, dried phospha-alumina powder had a 31% loss on ignition. A portion of the powder (4.25 pounds as is or 2.93 pounds solids) was discharged to a Simpson muller. A solution of 1.75 liters water containing 66.6g of citric acid (5% by weight) was added to the muller. The material was mulled for 10 minutes. The free moisture was adjusted to 56% and extruded, first through a ¼ inch die and then through a 5/64 inch die. The pills were broken up and predried at 200° F and then calcined at 1050° F for three hours. The physical properties and pore volume of the calcined extrudate are given in Table I.

EXAMPLE IV

This example serves as a comparison for Example III where another sample of the phospha-alumina powder used in Example III was extruded with no citric acid. A portion of the powder (4.25 pounds as is) from Example III was charged to a Simpson muller, mulled 15 minutes with 1.4 liters of water and then an additional 8 minutes with one liter of water to give a material having a free moisture of 63.5%. The material was extruded, first through a ¼ inch die and then through a 5/64 inch die. The pills were broken, dried, and calcined as in Example III.

The physical properties and pore volume of the calcined extrudate are given in Table I.

EXAMPLE V

This example shows the use of citric acid as an extrusion aid for metal impregnated phospha-alumina powders.

A purified phospha-alumina powder was made according to the method of Example I. The purified powder was dried to 53% loss on ignition. Seven and one half pounds of the purified powder (3.53 pounds solids) were slurried in 3 gallons of water. Cobalt, molybdenum, and phosphorous were added in 1.8 liters of solution made according to the methods described in U.S. Pat. No. 3,232,887. The solution contained one pound of MoO3, 0.23 pounds of CoO, and 0.23 pounds of P$_2$O$_5$. The entire mixture was heated to 180° F for 40 minutes and then filtered. The filter cake was dried at 150° F for 4 hours. The tray dried material weighed 5.25 pounds and had a 21.5% loss on ignition. The material was charged to a Simpson muller with a 1.5 liter aqueous solution containing 56g of citric acid (3% by weight). The material was mulled for 20 minutes. An additional ½ liter of water was added with mulling to adjust the free moisture to 53.5%. The material was extruded, first through a ¼ inch die and then through a 5/64 inch die. The pills were broken, dried at 200° F for two hours and then calcined at 1100° F for 2 hours.

The physical properties and pore volume of the calcined extrudate are given in Table I.

TABLE I

| PROPERTIES OF CALCINED EXTRUDATES | | | | | |
|---|---|---|---|---|---|
| | EXAMPLE | | | | |
| | I | II | III | IV | V |
| % Citric Acid | 6 | 0 | 5 | 0 | 3 |
| ABD (gm/ml) | .48 | .33 | .47 | .39 | .67 |
| Crush (lbs.) | 19 | 6 | 11 | 5 | 16 |
| % Attrition | 99 | 99.8 | 99.1 | 98.3 | 99.4 |
| Pill Diameter (in.) | .0654 | .0717 | .066 | .067 | .064 |
| Composition (% by weight) | | | | | |
| Al$_2$O$_3$ | 87 | 87 | 85 | 85 | 69 |
| P$_2$O$_5$ | 9.6 | 9.6 | 12 | 12 | 12 |
| Na$_2$O | .04 | .04 | .08 | .08 | .05 |
| SO$_4$ | 2.0 | 2.0 | 1.0 | 1.0 | .34 |
| MoO$_3$ | 0 | 0 | 0 | 0 | 13.7 |
| CoO | 0 | 0 | 0 | 0 | 3.8 |
| Total Pore Volume | .7766 | 1.253 | .7321 | .8535 | .5252 |
| % PV > 600 Å Diameter | 15 | 33 | 19 | 30 | 7 |

We claim:

1. A process for preparing phospha-alumina extrudates having a relatively high crush strength, and relatively reduced pore volume in pores above 600 Å diameter comprising:
   A. Preparing a purified phospha-alumina powder comprising on a dry basis 3–30% P$_2$O$_5$ and 70–97% Al$_2$O$_3$.
   B. Mixing said purified phospha-alumina powder with water and from 0.1–15% by weight of a water-soluble polycarboxylic acid containing from 1–10 carbon atoms based on the dry weight of the powder.
   C. Adjusting the moisture content of said phospha-alumina powder to an extrudate level so as to allow extrusion; and then,
   D. Extruding said phospha-alumina powder to prepare a phospha-alumina extrudate whereby the extrusion rate is improved over phospha-alumina powders not so treated.

2. The process of claim 1 where the polycarboxylic acid is citric acid.

3. The process of claim 1 wherein the phospha-alumina extrudate is dried and calcined to prepare a catalyst support.

4. The process of claim 1 where the crush strength is increased by at least 25% over non-polycarboxylic acid treated material.

5. The process of claim 1 where pore volume above 600 Å of the product is decreased relative to that where no polycarboxylic acid is used.

6. The process of claim 1 where the shrinkage on calcination is increased over that where no polycarboxylic acid is used.

* * * * *

UNITED STATES PATENT AND TRADEMARK OFFICE
CERTIFICATE OF CORRECTION

PATENT NO. : 4,132,669
DATED : January 2, 1979
INVENTOR(S) : Monica E. Choca, et al It is certified that error appears in the above-identified patent and that said Letters Patent are hereby corrected as shown below:

Line 11 of Claim 1

[1-10] carbon atoms based on the dry weight of the

"Letters Patent should read as"

2-10 carbon atoms based on the dry weight of the

Signed and Sealed this

Third Day of April 1979

[SEAL]

Attest:

RUTH C. MASON
Attesting Officer

DONALD W. BANNER
Commissioner of Patents and Trademarks